(12) United States Patent
Hannemann et al.

(10) Patent No.: US 11,673,358 B2
(45) Date of Patent: Jun. 13, 2023

(54) SYSTEM AND METHODS FOR FORMING A SOLE STRUCTURE

(71) Applicant: NIKE, Inc., Beaverton, OR (US)

(72) Inventors: Shayne Hannemann, Portland, OR (US); Kimberly Nichole McConnell, West Chester, OH (US); Justin Andrew Meyer, Hamilton, OH (US); Rick Alan Pollard, Moscow, OH (US)

(73) Assignee: NIKE, Inc., Beaverton, OR (US)

( * ) Notice: Subject to any disclaimer, the term of this patent is extended or adjusted under 35 U.S.C. 154(b) by 561 days.

(21) Appl. No.: 16/687,548

(22) Filed: Nov. 18, 2019

(65) Prior Publication Data

US 2020/0156341 A1 May 21, 2020

Related U.S. Application Data

(60) Provisional application No. 62/770,713, filed on Nov. 21, 2018.

(51) Int. Cl.
| | |
|---|---|
| *B29D 35/14* | (2010.01) |
| *B29C 44/34* | (2006.01) |
| *A43B 13/04* | (2006.01) |
| *A43B 13/20* | (2006.01) |
| *B29D 35/12* | (2010.01) |
| *B29K 105/04* | (2006.01) |
| *B29L 31/50* | (2006.01) |

(52) U.S. Cl.
CPC ........ *B29D 35/142* (2013.01); *B29C 44/3446* (2013.01); *A43B 13/04* (2013.01); *A43B 13/20* (2013.01); *B29C 44/348* (2013.01); *B29D 35/122* (2013.01); *B29D 35/148* (2013.01); *B29K 2105/04* (2013.01); *B29L 2031/504* (2013.01)

(58) Field of Classification Search
None
See application file for complete search history.

(56) References Cited

U.S. PATENT DOCUMENTS

| 5,447,425 A | 9/1995 | Hsu et al. |
|---|---|---|
| 2015/0038606 A1 | 2/2015 | Baghdadi |

(Continued)

FOREIGN PATENT DOCUMENTS

| BE | 786969 A | 11/1972 |
|---|---|---|
| CA | 2024814 A1 | 3/1991 |

(Continued)

OTHER PUBLICATIONS

International Preliminary Report on Pantentability received for PCT Patent Application No. PCT/US2019/062060, dated Jun. 3, 2021, 8 pages.

(Continued)

*Primary Examiner* — Robert J Grun
(74) *Attorney, Agent, or Firm* — Shook, Hardy & Bacon L.L.P.

(57) ABSTRACT

A molding system and a method for forming a sole structure are provided. The method includes flowing a molten polymeric material into a mold from an upstream device, receiving the molten polymeric material in a cavity of the mold, and maintaining a repeatable, uniform pressure profile as the molten polymeric material is delivered into the mold.

9 Claims, 9 Drawing Sheets

(56) References Cited

U.S. PATENT DOCUMENTS

| | | |
|---|---|---|
| 2015/0140148 A1 | 5/2015 | Komiya |
| 2015/0174803 A1 | 6/2015 | Newman et al. |
| 2016/0039162 A1 | 2/2016 | Murphy et al. |
| 2016/0257047 A1 | 9/2016 | Maruyama |
| 2017/0057147 A1* | 3/2017 | Altonen ............... G05B 19/042 |
| 2017/0057148 A1 | 3/2017 | Altonen et al. |
| 2018/0370108 A1* | 12/2018 | Lawless, III ............ B29C 45/77 |
| 2020/0156292 A1 | 5/2020 | Hannemann et al. |

FOREIGN PATENT DOCUMENTS

| | | |
|---|---|---|
| CA | 2083944 A1 | 12/1991 |
| CN | 1894317 A | 1/2007 |
| CN | 102179893 A | 9/2011 |
| CN | 104890177 A | 9/2015 |
| CN | 204844599 U | 12/2015 |
| CN | 106525264 A | 3/2017 |
| CN | 206663723 U | 11/2017 |
| DE | 10329249 A1 | 1/2005 |
| EP | 0765722 A1 | 4/1997 |
| EP | 3100841 A1 | 12/2016 |
| GB | 964301 A | 7/1964 |
| JP | H05253984 A | 10/1993 |
| WO | 03072335 A1 | 9/2003 |
| WO | 2015/088431 A1 | 6/2015 |

OTHER PUBLICATIONS

International Preliminary Report on Pantentability received for PCT Patent Application No. PCT/US2019/062065, dated Jun. 3, 2021, 8 pages.

Chen, N., "The Effects of Crosslinking on Foaming of EVA," Doctor of Philosophy Thesis, University of Toronto, Department of Mechanical and Industrial Engineering, Aug. 20, 2012, 128 pages.

International Search Report and Written Opinion received for PCT Patent Application No. PCT/US2019/062060, dated Feb. 19, 2020, 10 pages.

ISA European Patent Office, International Search Report and Written Opinion Issued in Application No. PCT/CN2018/115087, dated Feb. 13, 2020, WIPO, 6 pages.

Notice of Allowance received for U.S. Appl. No. 16/687,531, dated Jun. 23, 2022, 7 pages.

Non-Final Office Action received for U.S. Appl. No. 16/687,531, dated Jan. 21, 2022, 9 pages.

Non-Final Office Action received for U.S. Appl. No. 17/950,739, dated Mar. 30, 2023, 11 pages.

* cited by examiner

000
SYSTEM AND METHODS FOR FORMING A SOLE STRUCTURE

CROSS REFERENCE TO RELATED APPLICATIONS

The present application claims priority to U.S. Provisional Patent Application No. 62/770,713, entitled "SYSTEM AND METHODS FOR FORMING A SOLE STRUCTURE", filed on Nov. 21, 2018. The entire contents of the above-listed application are hereby incorporated by reference for all purposes.

FIELD

The present description relates generally to methods and systems for molding a polymer material.

BACKGROUND

A sole structure of an article of footwear may be formed by an injection molding system. The injection molding process may be automated for cost-effective manufacturing of footwear. A quality of the molded sole structure may be dependent upon physical parameters during the injection molding process.

SUMMARY

Injection molding systems may allow for efficient manufacturing of sole structures for footwear. Automation of the injection molding process may, however, lead to variations in physical conditions such as a pressure at a nozzle of a device used to inject a molten material to form the sole structure as well as a temperature of the molten material. Variability in the pressure and/or temperature may lead to inconsistencies in cell size, expansion ratio, and mechanical properties of the sole structure. One method of reducing variability between injection molded sole structures may include controlling the nozzle pressure of the injecting device by adjusting an injection rate of the molten material into cavity mold cavity to maintain the nozzle pressure adherent to a pressure profile during the molding process. Another method may include maintaining a temperature of the molten material within an injecting device at a pre-set melt temperature.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
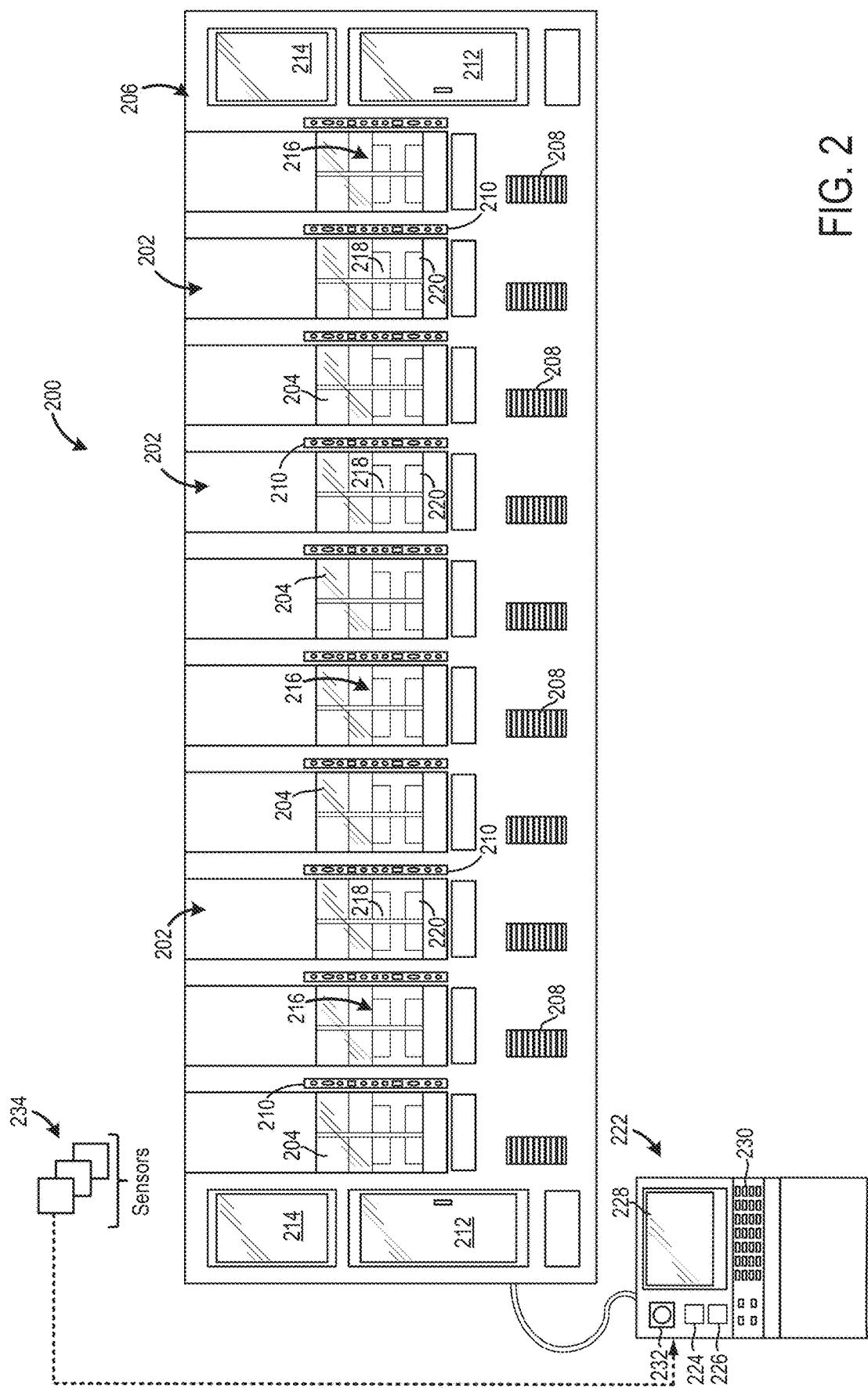
FIG. 2 shows an example of an automated injection molding machine that may be used to form a sole structure of an article of footwear.
Figure 3:
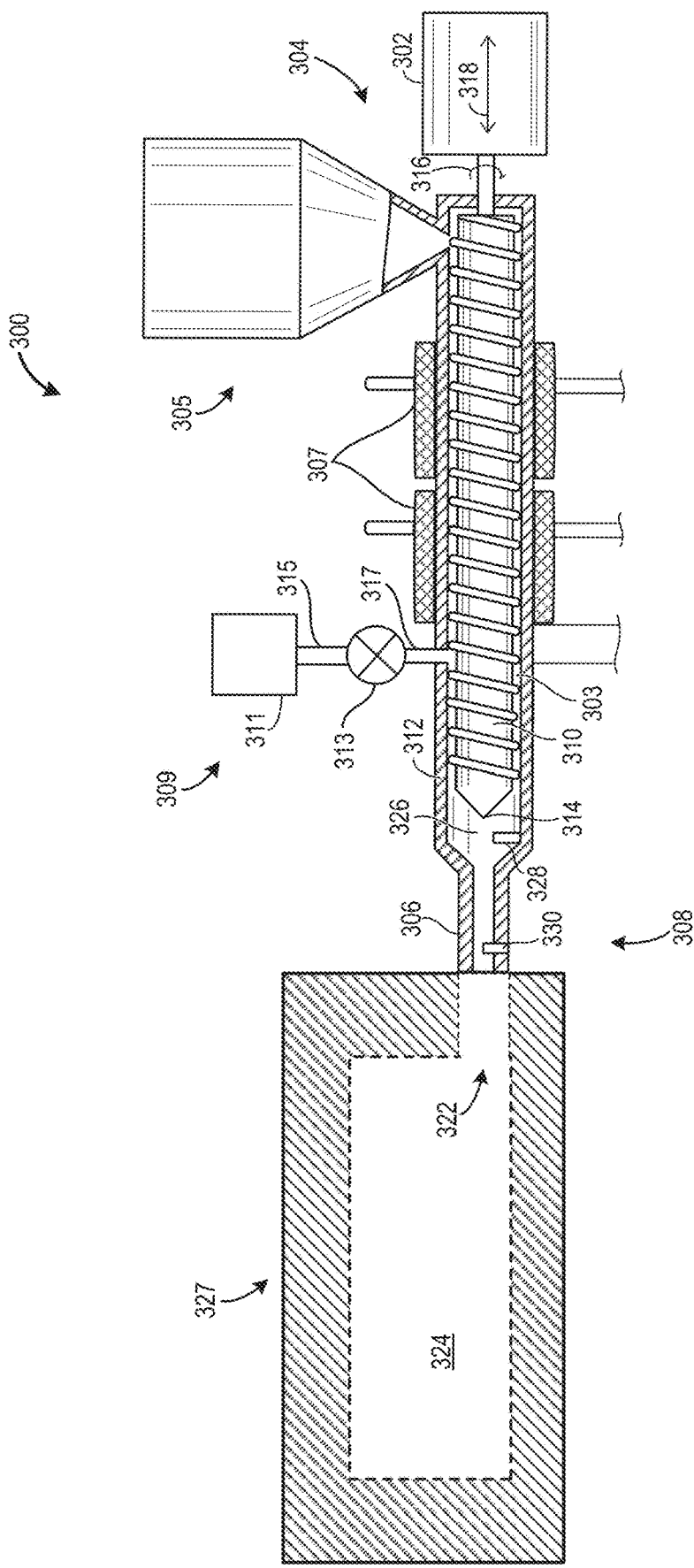
FIG. 3 shows an example of an injecting device used in an injection molding machine to deliver a foamed polymeric material to a mold.
Figure 5:
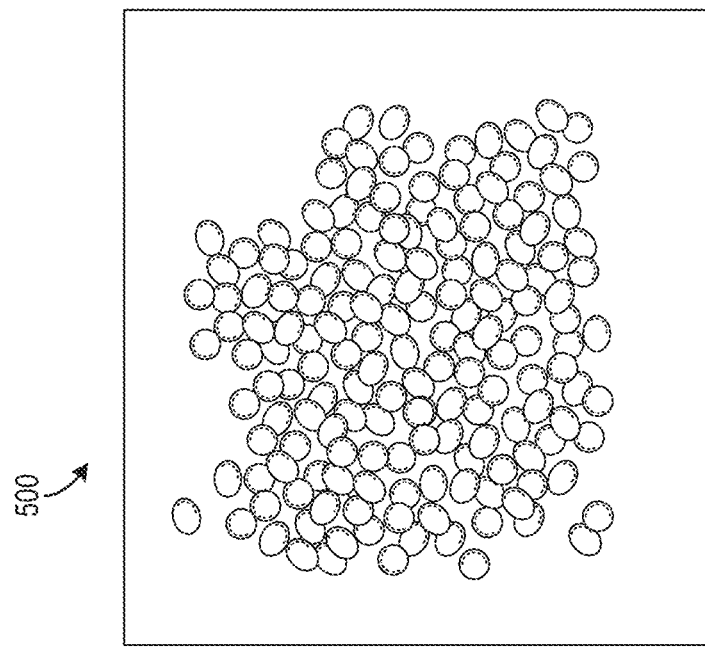
FIG. 5 shows an example of small pellets of a material that may be used to form a foamed polymer material.
Figure 4:
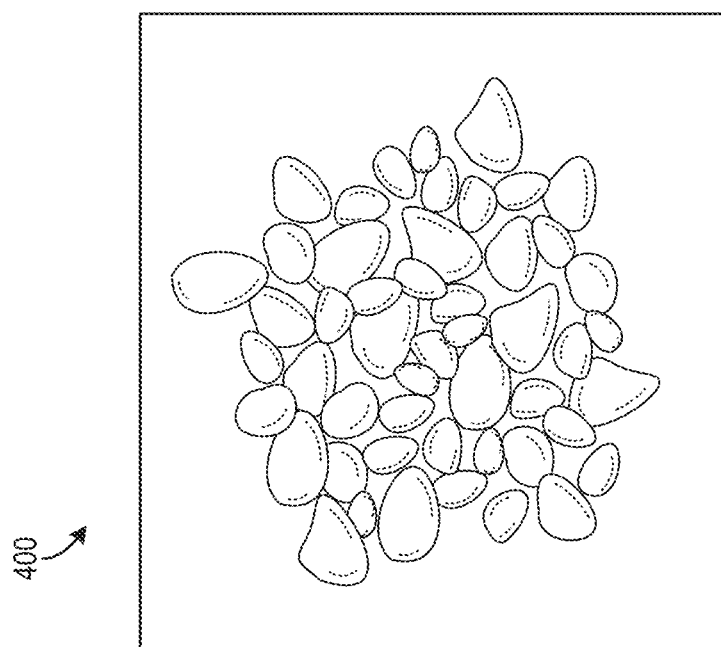
FIG. 4 shows an example of large pellets of a material that may be used to form a foamed polymer material.
Figure 6:
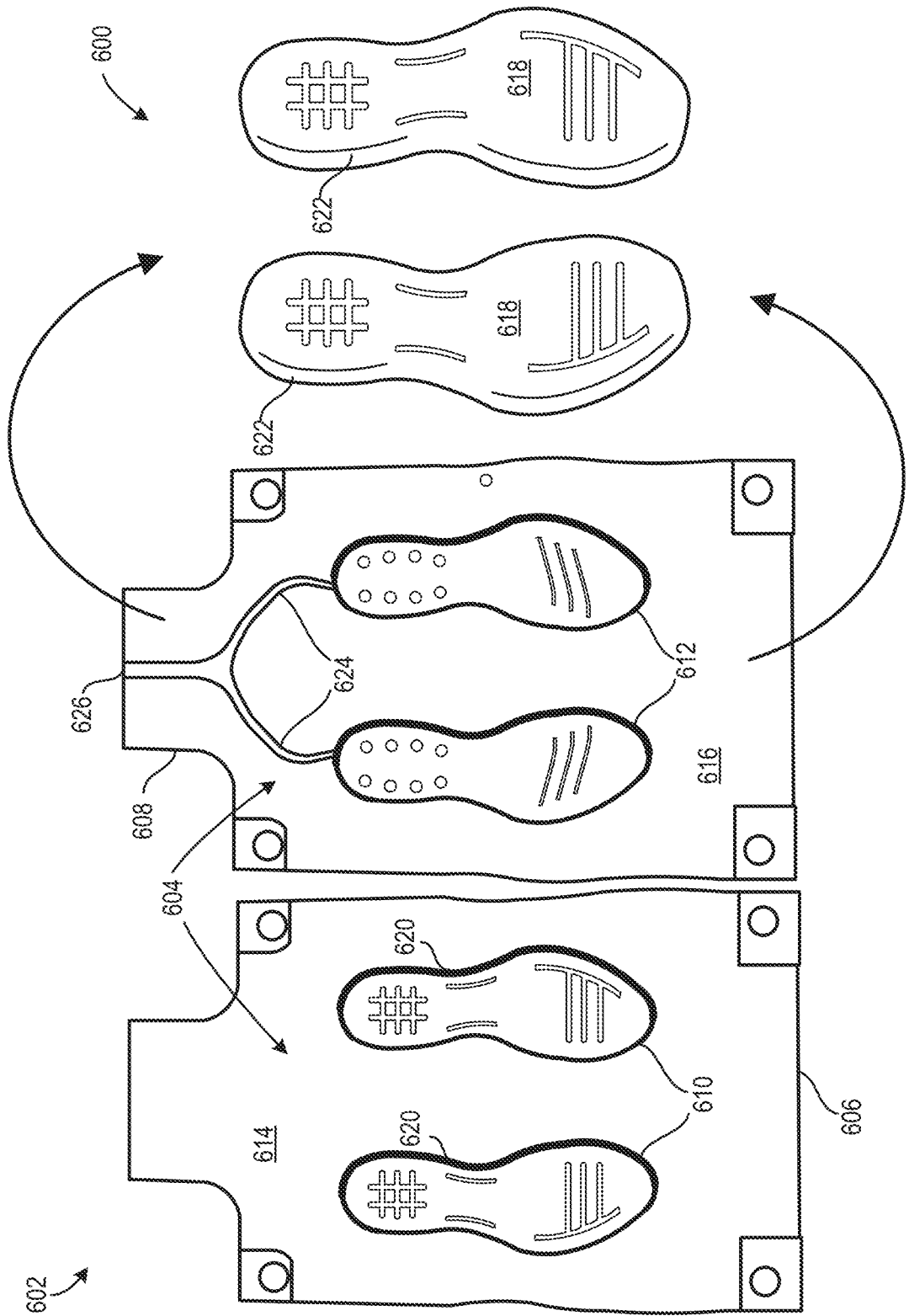
FIG. 6 shows an example of expansion of the polymer material during formation of a sole structure for an article of footwear.
Figure 7:
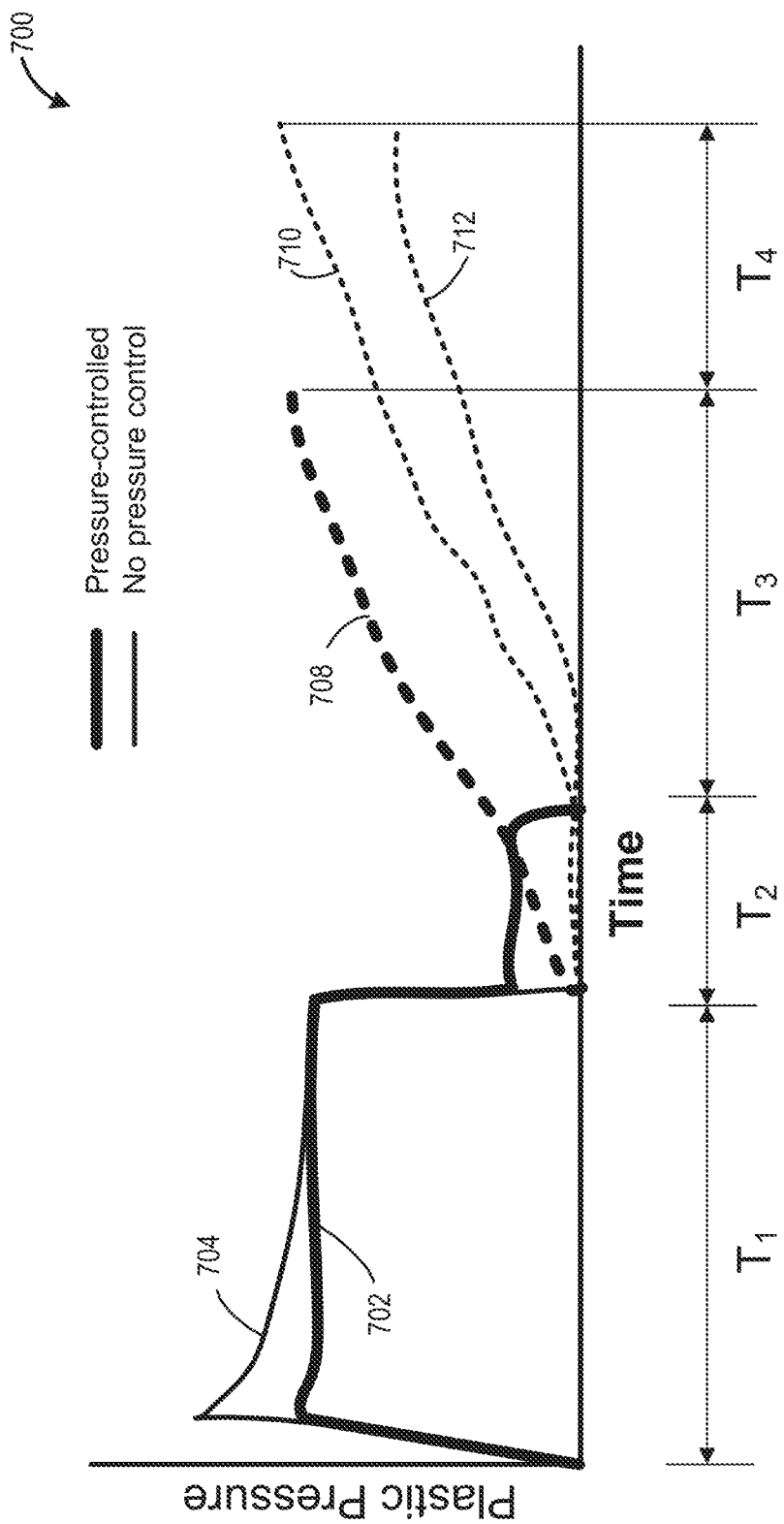
FIG. 7 shows an example of a graph comparing a plotted pressure profile of an injection molding process subjected to a pressure feedback loop to a plotted pressure profile of an injection molding process where the cavity mold pressure is not controlled.
Figure 9:
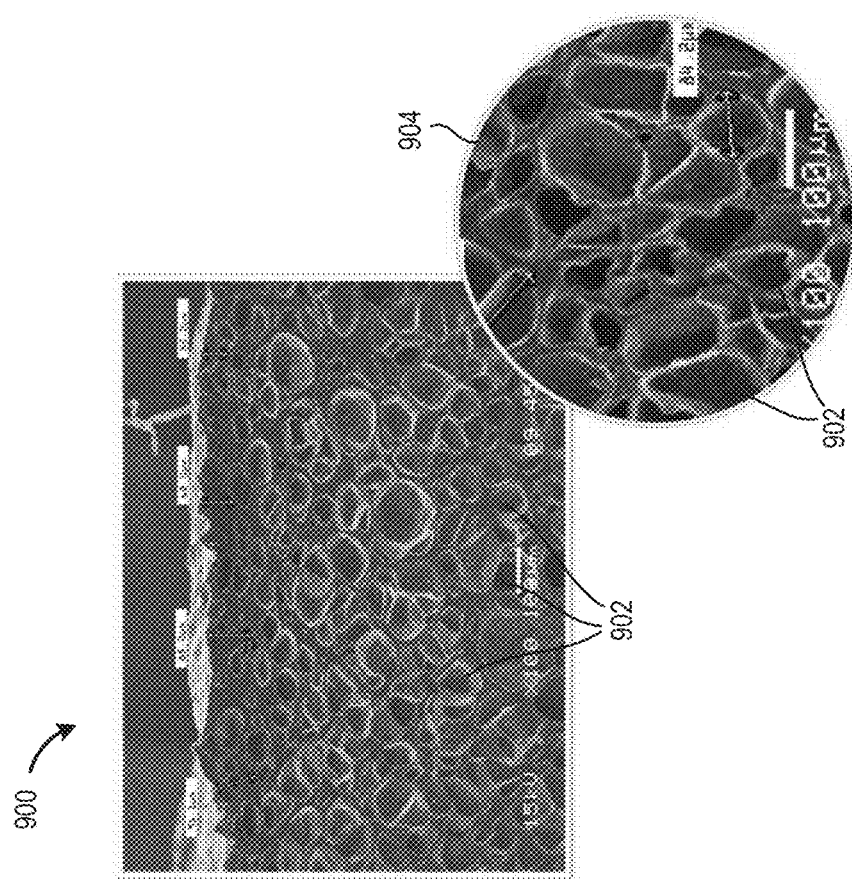
FIG. 9 shows a scanning electron microscopy image of cells of a polymer product resulting from an injection molding process where a nozzle pressure of an injecting device is controlled.
Figure 8:
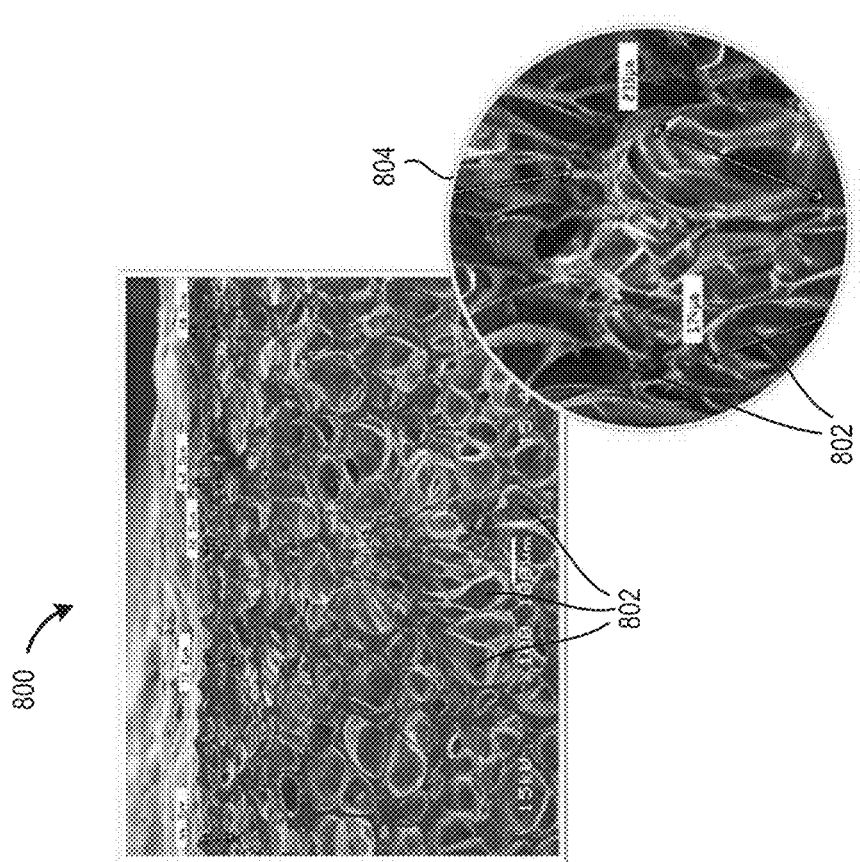
FIG. 8 shows a scanning electron microscopy image of cells of a polymer product resulting from an injection molding process where the cavity mold pressure is not controlled.
Figure 10:
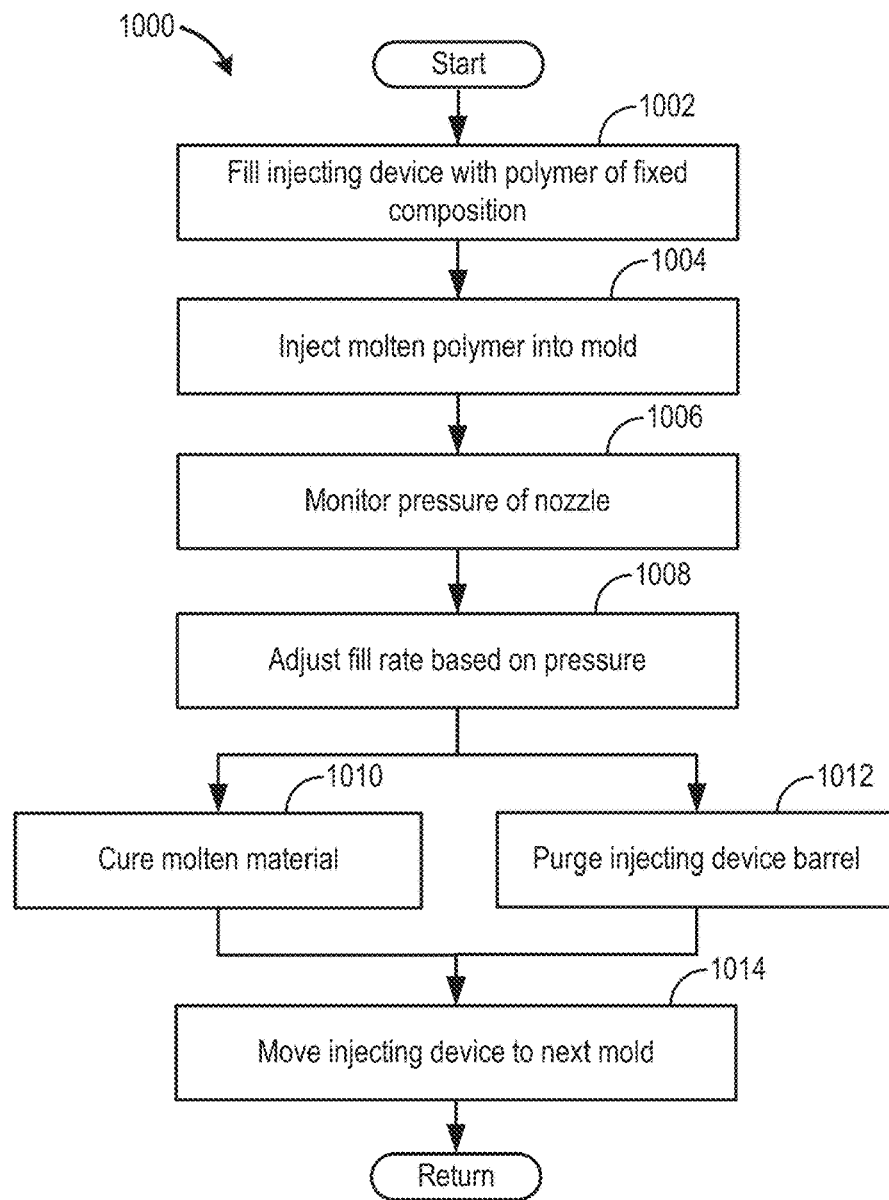
FIG. 10 shows an example of a routine for forming an injection molded product using a pressure feedback system to adjust a fill rate based on nozzle pressure.
Figure 11:
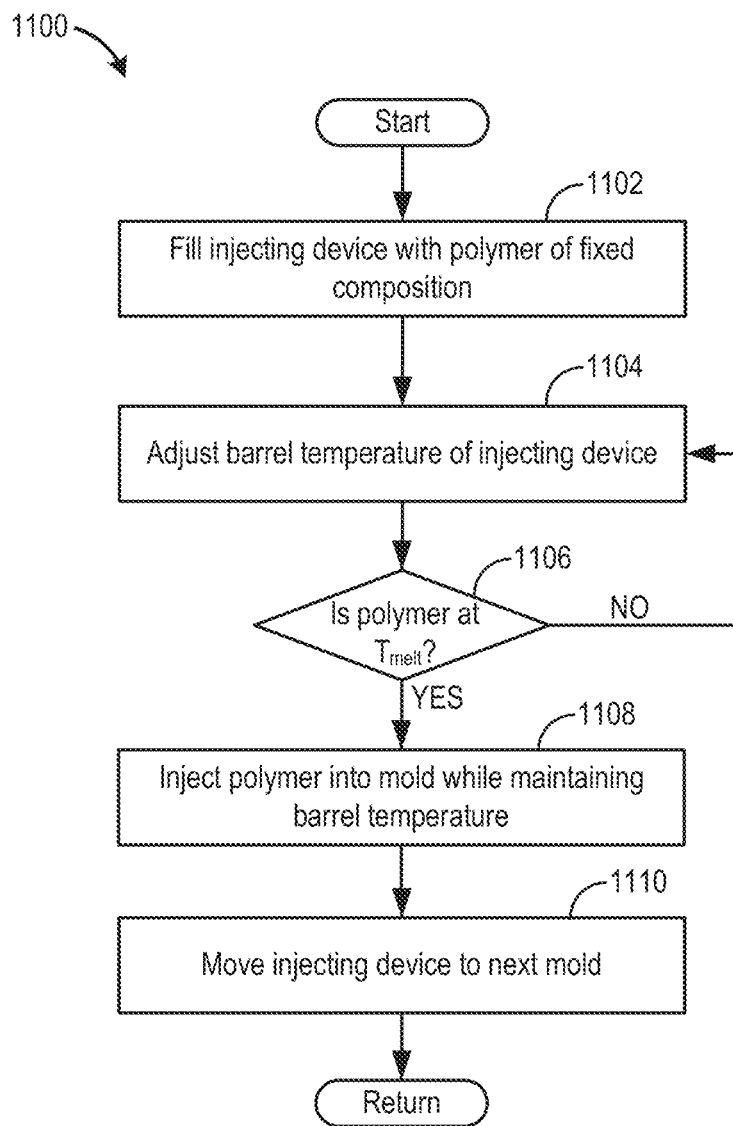
FIG. 11 shows an example of a routine for forming an injection molded product using a temperature feedback system to adjust a temperature of a molten polymeric material flowed into mold cavities.

The following description relates to systems and methods for controlling physical parameters, such as pressure and temperature in an automated injection molding process. The injection molding process may be used to form polymer products, such as a sole structure of a shoe, as shown in an exploded view of the shoe in FIG. 1. Formation of polymer products may be accomplished by an automated injection molding machine. An example of the injection molding machine is shown in FIG. 2, comprising a plurality of molds arranged in a row. A foamed, molten polymer material may be injected into cavities of the plurality of molds by an injecting device, as shown in FIG. 3. The polymer material may be a blend of two or more types of pellets, the types of pellets having different compositions and/or sizes that form a single phase solution upon melting in the injecting device. Examples of two different types of pellets that may be used to form the polymer material are shown in FIGS. 4 and 5. The molten polymer material may expand upon curing, to larger dimensions than the cavity of the mold into which the material is injected. Expansion of the sole structure of the shoe relative to the mold is depicted in FIG. 6. A graph is shown in FIG. 7, plotting pressure profiles of nozzles of injecting devices during an injection molding process where cavity nozzle pressure is controlled by adjusting an injection rate of polymer material into the mold cavity and during an injection molding process where the nozzle pressure is not regulated. Scanning microscopy images comparing a cellular distribution in the products of the two processes of FIG. 7 are shown in FIGS. 8 and 9. Example routines describing injection molding processes using a pressure feedback system to adjust a fill rate into the mold cavity and using a temperature feedback system to regulate a temperature of the molten polymeric material within the injecting device are depicted in FIGS. 10 and 11, respectively.

Injection molding may be used to manufacture various polymer-based products, a process that may provide a variety of benefits such as formation of complex geometries and details, high production output, adaptability to different materials, decreased material waste, enhanced control over product color, and ease of conversion to automation. Such benefits may leveraged for fabrication of sole structures for footwear, where a molten polymer, configured to foam and expand, is injected into a mold that determines a shape of the sole structure. Once cured, the sole structure expands when released from the mold, the amount of expansion dependent on a combination of parameters including polymer composition, cellular structure, and polymer temperature.

The process for forming injection molded sole structures has been plagued with inconsistent results due to inadequate control over the injection molding process. For example, fluctuations in pressure and temperature during the process may lead to variations in cell size of the polymer material, in skin thickness and density, as well as in mechanical properties such as strength, stiffness, and surface quality of the products. In addition, variability in an expansion ratio of the polymer material due to inconsistent physical conditions during fabrication may result in unpredictable and variable sole structure size.

The inventors have recognized the aforementioned problems and have developed systems and methods for injection molding of foamed polymer materials which may achieve objectives that at least partially overcome the issues. One of the objectives may be to maintain repeatable, consistent physical parameters during the injection molding process to reduce variability between products formed via a single method. In one example, the objectives are at least in part achieved via a method for molding a sole structure. The method includes flowing a molten polymeric material into a mold from an upstream device and receiving the molten polymeric material in a cavity of the mold. The method further includes maintaining a repeatable, uniform pressure profile of the nozzle of the device while the material is delivered into the mold. By flowing the material into the mold while maintaining the pressure profile, variability between consecutive formations of polymer products formed by the method may be reduced. As a result, control of the dimensions and physical properties of the injection molded products may be improved. In one example, the method may include detecting a pressure in the cavity of the mold during injection of the molten polymeric material. In response to the detected pressure, the flow of molten polymeric material into the cavity may be adjusted in order to maintain a desired pressure according to a predetermined pressure profile. In such an example, an introduction of polymer material to the initially empty cavity may generate backpressure that leads to fluctuations in nozzle pressure. Such fluctuations may be accounted for by providing a closed pressure sensing loop that allows for regulation of a fill rate of the mold cavity In another example, a method is provided for molding a sole structure. The method includes maintaining a melt temperature of a polymeric material in an injection device by adjusting heating of the injection device automatically responsive to sensed temperature. The method further includes injecting the polymeric material from the injection device into a cavity of a mold. By adjusting the temperature of the polymeric material to remain at the melt temperature, a physical state of the polymeric material is held consistent throughout a molding process. In one example, maintaining the melt temperature of the polymeric material includes delaying injection into the cavity of the mold until the temperature returns to the melt temperature. In this way, uniformity between successively molded sole structures may be achieved.

In another example, a system is provided for forming a sole structure of a shoe. The system includes an injecting device configured to inject a molten polymeric material, adapted with a pressure sensor, and a mold with a cavity to receive the molten polymeric material from the injecting device. In one example, the system may include detecting a pressure in a nozzle of the upstream device. In such an example, a pressure sensor may be provided at the nozzle and signals obtained from the sensor may be used to adjust a flow rate of polymeric material into the mold to achieve and maintain a desired pressure profile of the nozzle. The flow rate may be adjusted by adapting the injecting device with a screw that is electronically adjusted in response to the detected nozzle pressure.

In another example, an injection molding system is provided. The injection molding system includes a plurality of molds arranged in a plurality of chambers arranged adjacently in a row and at least two automated injecting devices, the injecting devices adapted to couple to ports in the plurality of molds. The injection molding system also includes a molten polymeric material delivered to the plurality of molds by the injecting devices, where injection from the injecting devices is independently controlled to maintain a desired pressure profile during injection. In one example, the injection molding system is adapted with a controller including instructions stored in memory executable by a processor to operate a temperature and pressure control assembly. The temperature and pressure control assembly is configured to adjust the temperature of the polymeric material and to control pressure in a nozzle in each of the injecting devices. A consistent and repeatable control of the temperature of polymeric material and pressure of the nozzles is thus achieved. This new system and approach creates a new archetype of manufacturing quality control and presents new methods to achieve a significantly different result.

Figure 1:
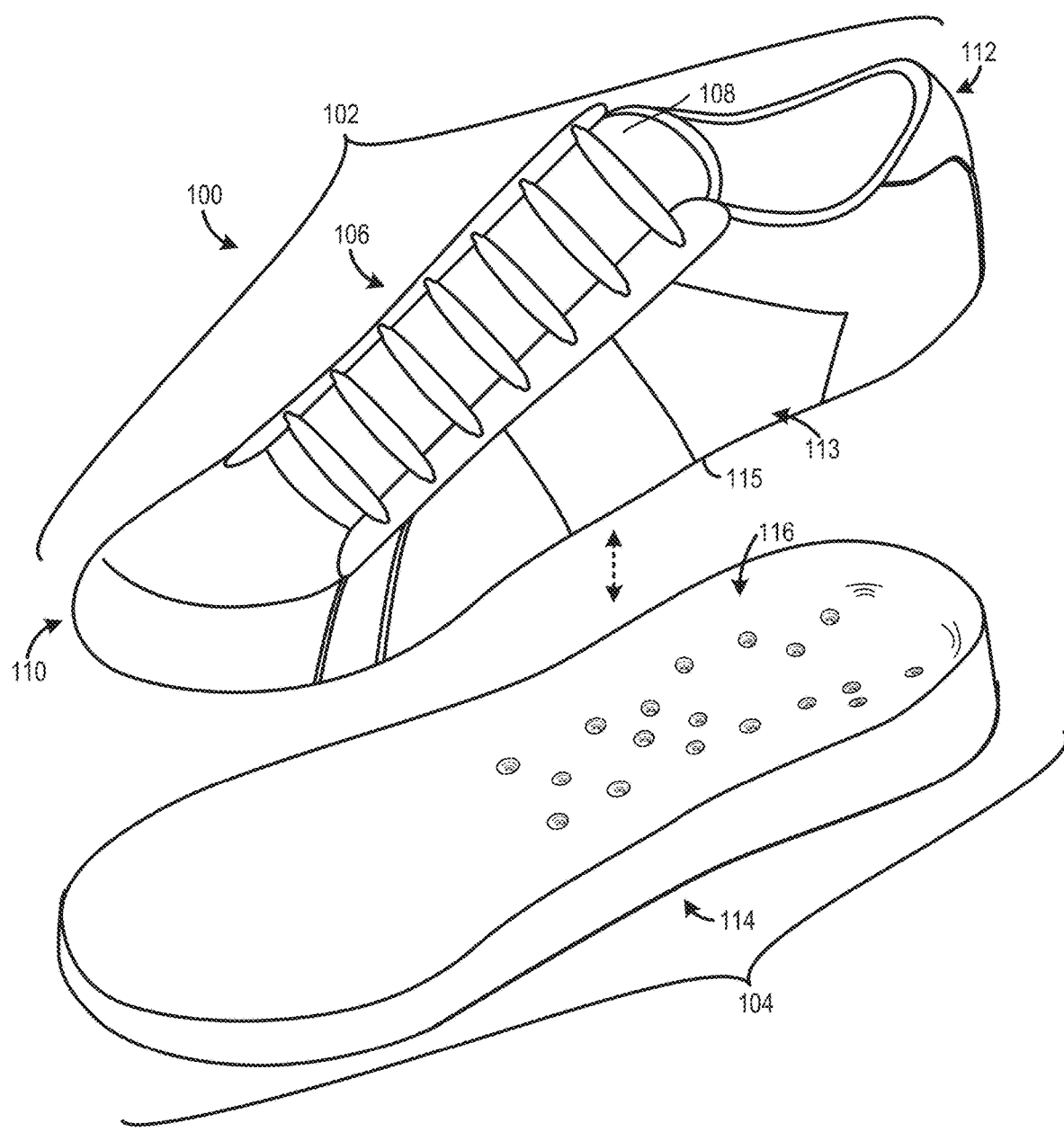
FIG. 1 shows an exploded view of an article of footwear including a sole structure that may be formed by an injection molding system.

FIG. 1 shows an exploded view of an article of footwear 100 having an upper 102 and a sole structure 104 (hereafter referred to as the sole 104). Therefore, the upper 102 may be referred to as a footwear upper and the sole 104 may be referred to as a footwear sole 104, in some examples. It will be appreciated that at least a portion of the sole 104 may be formed by a molding system and method, discussed above with regard to FIGS. 2-11. The upper 102 is also at least partially constructed out of a natural and/or synthetic leather material. The upper 102 is also shown including a lacing section 106, a tongue 108, a toe section 110, and a heel section 112. However, it will be appreciated the article of footwear may include numerous additional or alternative sections. Moreover, different sections of the upper 102 may be formed from different materials. For instance, the lacing section 106 may be constructed out of a synthetic material while sections below the lacing section may be constructed out of a natural leather material. However, at least a bite line 113 and/or an underside 115 of the upper 102 may include natural and/or synthetic leather material. The different sections of the upper 102 may be attached via stitching, adhesive attachment, fabric welding, etc.

The sole 104 may include an outsole 114 which may be constructed out of a resilient material designed to contact an external surface (e.g., road, trail, floor, etc.). The resilient material may include rubber, an elastomeric material, etc. The sole 104 may also include a midsole 116 providing cushioning to the article of footwear 100. The midsole 116 may be constructed out of materials such as ethylene-vinyl acetate (EVA) foams, PU foams, etc. It will be appreciated that the sole may include other components such as cushioning components (e.g., airbags), protective components (e.g., plates), etc.

At least a portion of the sole 104, such as the midsole 116, may be formed through a process where a polymeric material configured to foam, such as EVA, is injected into a mold. The polymeric material may be mixed with a chemical or physical blowing agent that initiates foaming and expansion of the material. Release of the product from the mold allows the product to expand following a curing period where polymers of the polymeric material are cross-linked to provide rigidity and structure to the product. The product may expand by an amount that is dependent upon a composition of the polymeric material, a balance between the polymeric material and blowing agent, and physical conditions during the injection molding process, such as temperature and pressure.

The injection molding process may be conducted in an automated system that allows for formation of multiple products in-line. An example of an automated molding system 200 (e.g., injection molding system) is shown in FIG. 2. Although the molding system 200 is depicted with a plurality of molds enclosed in chambers arranged in a row, other embodiments may include variations in the form, profile, orientation, etc., of components of the molding system 200. Furthermore, it will be appreciated that a control of physical parameters of the molding system may be applied to other systems where it is desirable to adjust a temperature and/or pressure in a chamber housing a molten polymeric material.

The molding system 200 may be a multi-station apparatus including a plurality of chambers 202 arranged in a row. Chamber windows 204 of the plurality of chambers 202 are arranged on a front-facing side 206 of the molding system 200. The chamber windows 204 provide a view of components enclosed within each of the plurality of chambers 202 and also may be configured to slide open to allow access to interiors of each of the plurality of chambers 202. The front-facing side 206 of the molding system 200 may also include a plurality of vents 208 for air exchange between an interior of the molding system 200 and surrounding ambient air, control panels 210 adjacent to each of the chamber windows 204, doors 212 for accessing mechanical and electronic components of the molding system 200 and window panels 214 for viewing a status of the mechanical and electronic components. The doors 212 and window panels 214 may be positioned at extreme ends of the molding system 200.

Each of the plurality of chambers 202 may include molds 216 housed within the interiors of the plurality of chambers 202. The molds 216 each comprises an upper plate 218 and a lower plate 220 that may be stacked, e.g., the upper plate 218 directly over and in contact with the lower plate 220, to enclose cavities of the molds 216. The cavities are hollow chambers shaped according to a desired geometry of the injection molded product and adapted to receive the foamed polymeric material from an injecting device through inlet ports in the molds 216. The upper plate 218 and lower plate 220 are separated when curing of the polymeric material is complete to allow the molded product to be removed. Physical conditions of the molds 216, such as temperature and pressure, may be controlled by temperature and pressure control assemblies, receiving commands from a computing device 222 communicatively coupled to the plurality of chambers 202.

The computing device 222 is included in the molding system 200 which may be a controller configured to adjust various aspects of the molding process. The computing device 222 includes a memory 224 and a processor 226. The memory 224 may include volatile, nonvolatile, non-transitory, dynamic, static, read/write, read-only, random-access, sequential-access, location-addressable, file-addressable, and/or content-addressable devices. Additionally, the processor 226 may be a single-core or multi-core device, and the instructions executed thereon may be configured for sequential, parallel, and/or distributed processing. Although the computing device 222 is shown directly coupled to the plurality of chambers 202, the computing device 222 may be remotely located, in other instances. In such an example, the computing device 222 may be electronically (e.g., wired and/or wirelessly) connected to the plurality of chambers 202 and other components in the system.

The computing device 222 also includes a display device 228. The display device 228 may be used to present a visual representation of data held by the memory 224. The graphics presented on the display device 228 may take the form of a graphical user interface (GUI) and/or other suitable interfaces, for instance. The computing device 222 also includes an input device 230. In the illustrated example, the input device 230 is in the form of a keyboard. The input device may additionally or alternatively include a mouse, joystick, camera, microphone, touchscreen, combinations thereof, etc. Thus, user input may be used to adjust different aspects of the molding process, in some examples. Additionally or alternatively, automated instructions may trigger changes in the molding process. Furthermore, the display device and/or the input device may be omitted from the computing device, in other embodiments.

The computing device 222 may also include a condition indicator 232 which may indicate that the molding system 200 has reached one or more desired operating condition(s) (e.g., shot tuning chamber pressure and/or temperature set-points, mold temperature set-points, mold counter pressure set-points, combinations thereof, etc.). Thus, the condition indicator 232 may indicate to a system operator that a desired condition has been achieved such as a desired nozzle pressure of devices used to inject material into the molds 216. Responsive to the condition indicator being triggered the system operator may command the system to take a desired action via the input device 230, such as adjusting an injection rate of the molten polymeric material into the mold cavity. The condition indicator 232 may include audio, graphical, and/or haptic components for alerting the system operator. The graphical indicator may be included in the display device and/or may include one or more light(s) for signaling the operator. In this way, certain aspects of the molding process may be manually controlled. However, in other examples, more automated control strategies may be utilized.

Sensors 234 may also provide signals to the computing device 222. The sensors may include temperature sensors, pressure sensors, etc. The sensors may be attached to or integrated into the injecting device and/or downstream components such as the plurality of chambers 202, described in more detail herein with regard to FIGS. 3-11. For instance, the injecting device and/or the plurality of chambers 202 may include temperature sensor(s), pressure sensor(s), and/or combined temperature-pressure sensor(s) sending signals to the computing device 222. The sensors enable the temperatures and pressures in selected sections of the system to be determined.

In some examples, the temperature and/or pressure in selected sections of the system may be determined (e.g., estimated) from temperature and/or pressure sensor readings in other sections of the system. Additionally, instructions (e.g., code) stored in the memory 224 of the computing device 222 may include instructions for implementing the molding methods, processes, techniques, control schemes, etc., described herein. As such, instructions may be stored in the memory 224 that cause the processor 226 to implement the actions, steps, features, etc., of the molding system described herein.

An example of an injecting device 300 is illustrated in FIG. 3 that may be an additional component in a molding system, such as the molding system 200 of FIG. 2. In one example, the molding system may include a single injecting device to deliver a polymeric material to a plurality of molds. In other examples, however, the molding system may have two or more injecting devices, individually operated to inject the polymeric material into distinct individual molds of the plurality of molds. By configuring the molding system with two or more injecting devices, a speed of production may be increased.

The injecting device 300 may be an elongate, tubular apparatus with an inner chamber 303. The injecting device 300 may be used to inject a molten polymeric material, configured to foam, into molds, such as the molds 216 of FIG. 2. The polymeric material may be delivered to the inner chamber as a solid phase, such as pellets or beads, by a reservoir 305 that is positioned above and coupled to a barrel 312 of the injecting device 300. The reservoir 305 is proximate to a first, upstream end 304 of the injecting device 300 and configured with a funnel-like geometry.

The polymeric material includes one or more thermoplastic polymers. The one or more thermoplastic polymers may include a thermoplastic elastomer (TPE). The one or more thermoplastic polymers may include aliphatic polymers, aromatic polymers, or mixtures of both. As an example, the one or more types of thermoplastic polymers may include a first type comprising large pellets, such as shown by large polymer pellets 400 of FIG. 4. The large polymer pellets 400 may be mixed with another type of thermoplastic polymer formed from small pellets, such as small polymer pellets 500 of FIG. 5. The large pellets 400 may have a different chemical composition from the small pellet 500. A relative proportion of the differently sized pellets may affect an overall composition of the polymeric material, as well as physical conditions such as melt temperature, viscosity, flexibility, etc.

In one example, the one or more thermoplastic polymers may include homopolymers, copolymers (including terpolymers), or mixtures of both. The copolymers may be random copolymers, block copolymers, alternating copolymers, periodic copolymers, or graft copolymers, for instance. The one or more thermoplastic polymers may include olefinic homopolymers or copolymers or a mixture of olefinic homopolymers and copolymers. Examples of olefinic polymers include polyethylene (PE) and polypropylene (PP). For example, the PE may be a PE homopolymer such as a low density PE or a high density PE, a low molecular weight PE or an ultra-high molecular weight PE, a linear PE or a branched chain PE, etc. The PE may be an ethylene copolymer such as, for example, an ethylene-vinyl acetate (EVA) copolymer, an ethylene-vinyl alcohol (EVOH) copolymer, an ethylene-ethyl acrylate copolymer, an ethylene-unsaturated mono-fatty acid copolymer, etc. The one or more thermoplastic polymers may include a polyacrylate such as a polyacrylic acid, an ester of a polyacrylic acid, a polyacrylonitrile, a polyacrylic acetate, a polymethyl acrylate, a polyethyl acrylate, a polybutyl acrylate, a polymethyl methacrylate, a polyvinyl acetate, etc., including derivatives thereof, copolymers thereof, and any mixture thereof, in one example. The one or more thermoplastic polymers may include an ionomeric polymer. The ionomeric polymer may be a polycarboxylic acid or a derivative of a polycarboxylic acid, for instance. The ionomeric polymer may be a sodium salt, a magnesium salt, a potassium salt, or a salt of another metallic ion. The ionomeric polymer may be a fatty acid modified ionomeric polymer. Examples of ionomeric polymers include polystyrene sulfonate, and ethylene-methacrylic acid copolymers. The one or more thermoplastic polymers may include a polycarbonate. The one or more thermoplastic polymers may include a fluoropolymer. The one or more thermoplastic polymers may include a polysiloxane. The one or more thermoplastic polymers may include a vinyl polymer such as polyvinyl chloride (PVC), polyvinyl acetate, polyvinyl alcohol, etc. The one or more thermoplastic polymers may include a polystyrene. The polystyrene may be a styrene copolymer such as, for example, an acrylonitrile butadiene styrene (ABS), a styrene acrylonitrile (SAN), a styrene ethylene butylene styrene (SEBS), a styrene ethylene propylene styrene (SEPS), a styrene butadiene styrene (SBS), etc. The one or more thermoplastic polymers may include a polyamide (PA). The PA may be a PA 6, PA 66, PA 11, or a copolymer thereof. The polyester may be an aliphatic polyester homopolymer or copolymer such as polyglycolic acid, polylactic acid, polycaprolactone, polyhydroxybutyrate, and the like. The polyester may be a semi-aromatic copolymer such as polyethylene terephthalate (PET) or polybutylene terephthalate (PBT). The one or more thermoplastic polymers may include a polyether such as a polyethylene glycol or polypropylene glycol, including copolymers thereof. The one or more thermoplastic polymers may include a polyurethane, including an aromatic polyurethane derived from an aromatic isocyanate such as diphenylmethane diisocyanate (MDI) or toluene diisocyanate (TDI), or an aliphatic polyurethane derived from an aliphatic isocyanate such as hexamethylene diisocyanate (HDI) or isophone diisocyanate (IPDI), or a mixture of both an aromatic polyurethane and an aliphatic polyurethane.

Optionally, in addition to the one or more thermoplastic polymers, the polymeric material may further include a crosslinking agent. The crosslinking agent may be a peroxide-based crosslinking agent such as dicumyl peroxide. Optionally, in addition to the one or more thermoplastic polymers, the polymeric material may further include one or more fillers such as glass fiber, powdered glass, modified or natural silica, calcium carbonate, mica, paper, wood chips, modified or natural clays, modified or unmodified synthetic clays, talc, etc.

Specifically, in one example, the polymeric material may include EVA and/or thermoplastic polyurethane (TPU) and the molding system may create a molded footwear component (e.g., upper, midsole, and/or outsole). However, the molding system and processes described herein have far-reaching applicability to fields beyond the footwear industry such as the automotive industry, aerospace industry, packaging industry, sporting goods industry, etc. Therefore, the molding system may be designed to manufacture a wide variety of articles in any of the aforementioned fields. As described herein, an article may be any object, part, component, product, etc., used any of the aforementioned industries or in other suitable industries.

As the polymeric material enters the barrel 312 of the injecting device 300, the polymeric material may be heated via heating devices 307 coupled to the barrel 312. It will be appreciated that the heating devices 307 may increase a temperature of the barrel 312 which in turn may increase a temperature of the polymeric material. The heating devices 307 may be controlled by the computing device 222 shown in FIG. 2.

A blowing agent delivery assembly 309 is also coupled to the barrel 312 of the injecting device 300 at a region downstream of the heating devices 307 and upstream of a nozzle 306 at a second end 308 of the injecting device 300, the second end 308 downstream of the first end 304. The blowing agent delivery assembly 309 includes a blowing agent storage device 311 and a blowing agent valve 313. A blowing agent conduit 315 extends between the blowing agent valve 313 and blowing agent storage device 311. The blowing agent valve 313 is adapted to adjust an amount of blowing agent flowing into the barrel 312. For instance, the blowing agent valve 313 may be opened/closed to allow the blowing agent to be flowed into the barrel 312 during certain operating conditions and to prevent the blowing agent from flowing into the barrel during other operating conditions. Moreover, the blowing agent valve 313 may have a plurality of different open positions allowing the flowrate of the blowing agent delivered to the barrel 312 to be adjusted.

Another blowing agent conduit 317 extends between the blowing agent valve 313 and the barrel 312. Specifically, the blowing agent conduit 317 opens into the inner chamber 303 of the barrel 312 having a screw 310 housed therein. The blowing agent may be flowed into the molten polymeric material in the barrel to form a molten single phase solution (SPS). The molten SPS may therefore include the molten polymeric material and a blowing agent dissolved therein, in some examples.

The blowing agent may be a chemical blowing agent which forms a gas when heated. For example, the chemical blowing agent may be an azo compound such as adodicarbonamide, sodium bicarbonate, or an isocyanate that may be mixed with the polymeric material in the barrel 312 of the injecting device 300. Alternatively, the chemical blowing agent may already be incorporated into pellets formed from a polymeric material and introduced into the injecting device as a preformed mixture.

Other examples may include a physical blowing agent instead of or in addition to the chemical blowing agent. Specifically, the blowing agent may include nitrogen and/or carbon dioxide, in some examples. However, other suitable blowing agents may be used such as hydrocarbons (e.g., pentane, isopentane, and/or cyclopentane), hydrochlorofluorocarbons (HCFCs), mixtures thereof, etc. Other examples may include a chemical blowing agent. Furthermore, the blowing agent stored in the blowing agent storage device 311 may be stored and/or injected into the barrel 312 as a supercritical fluid (SCF).

The injecting device 300 may include a drive motor 302 at the first end 304. The drive motor 302 is coupled to the screw 310, the screw 310 extending a portion of a distance between the first end 304 and second end 308 of the injecting device 300 within the barrel 312 of the injecting device 300. The screw 310 may be positioned within the barrel 312 so that a tip 314 of the screw 310 is spaced away from an interior surface of the inner chamber 303 in a region where the nozzle 306 merges with the barrel 312.

The drive motor 302 may rotate the screw 310, as indicated by curved arrow 316, and/or advance and retract the screw 310 in the barrel 312, as indicated by arrow 318. In one example, the drive motor 302 may be an electric motor that provides screw adjustment functionality. Rotation of the screw 310 causes the SPS to flow downstream through the barrel 312. Advancement of the screw 310 in the barrel 312 toward the nozzle 306, induced by the drive motor 302, increases a pressure in the inner chamber 303 downstream of the tip 314 of the screw 310. The inner chamber 303 may be filled with the SPS and increasing the pressure downstream of the tip 314 of the screw 310 increases a pressure of the SPS, pushing the polymeric material out of the barrel and through the nozzle 306. In other examples, separate actuators may be used to rotate and advance/retract the screw.

A section 326 of the barrel 312 downstream of the screw 310 accumulates molten polymeric material (e.g., molten SPS) during operation of the injecting device 300. The section 326 may therefore provide a staging area housing both the molten polymeric material and the blowing agent. In another example, however, the section 326 may only house the molten polymeric material. In the illustrated example, a temperature sensor 328 is shown arranged in the section 326 of the barrel 312 downstream of the screw 310 and is in electronic communication with the computing device 222, shown in FIG. 2. The temperature sensor 328 is configured to measure a temperature of the molten polymeric material in the barrel 312. In addition, a pressure sensor 330 is positioned in the nozzle 306 of the injecting device to measure a pressure in the nozzle 306. However in other examples, additional or alternative suitable sensor positions have been contemplated, such as other locations between the nozzle 306 and the screw 310. Still further in other examples, a single sensor may be used to measure both temperature and pressure, additional temperature and/or pressure sensors may be coupled to the barrel or other locations in the system. Other sensors providing relevant information such as temperature, pressure, etc. may also be positioned within a mold 327 or within runners or gates of an automated molding system, such as the automated molding system 200 of FIG. 2.

The nozzle 306 of the injecting device 300 is adapted to couple to an inlet port 322 in a mold 327. In some examples, the nozzle 306 of the injecting device 300 may include a valve (not shown in FIG. 3) that is actuatable between an open position to allow the SPS to flow from the nozzle 306 through the inlet port 322 into a cavity 324 of the mold 327, and a closed position to block flow through the nozzle 306 and retain the SPS within the nozzle 306 and barrel 312 of the screw 310. The valve may be adjusted into positions between the open position and the closed position to regulate the flow of the SPS from the barrel 312 to the cavity 324, the position of the valve controlled by the computing device 222 of FIG. 2. However, in other examples, the injecting device 300 may not include the valve in the nozzle 306 and flow of the SPS from the nozzle 306 into the mold 327 may be controlled exclusively by rotation of the screw 310 by the drive motor 302. Thus, the computing device may use information received from the pressure sensor 330 to vary the injection rate of molten SPS in the mold cavity 324 to maintain a predetermined pressure profile based on a detected backpressure generated during filling of the cavity 324. Information from the temperature sensor 328 may be used to regulate power supplied to the heating devices 307 to adjust the temperature of the barrel 312, and hence the temperature of the SPS, to maintain the temperature at a melt temperature of the polymeric material.

The temperature of the SPS during injection into the mold cavity and the concurrent cavity pressure during the injection molding process may have significant effects on physical properties of the polymer product. In one example, a consistency of an expansion ratio of the SPS following a baking, or curing period for a given composition may rely on a repeatability of pressure control of the mold cavity. The given composition may be a set ratio of large and small pellets, e.g., the large pellets 400 and small pellets 500 of FIGS. 4 and 5 respectively, as well as amount of blowing agent added. With the ratio of large to small pellets held constant, variations in the expansion ratio between injection molded soles is attributable to physical parameters during the injection molding process occurring in the mold. The molten SPS may be configured to expand when thermally or chemically induced polymer crosslinking occurs. The expansion of the product, relative to an initial size determined by a cavity of a mold, is depicted in FIG. 6 by an example of a set of soles 600 that have been removed from a mold 602.

Expansion of the set of soles 600, formed from the SPS, within a cavity 604 of the mold 602 is suppressed until the mold 602 is opened and an upper plate 606 is separated from a lower plate 608 of the mold. The cavity 604 includes an upper portion 610 that is disposed in the upper plate 606 and a lower portion 612 disposed in the lower plate 608 of the mold 602. The upper plate 606 may have a similar outer shape as the lower plate 608 with the upper portion 610 of the cavity 604 arranged in a bottom face 614 of the upper plate 606. The bottom face 614 of the upper plate 606 is in face-sharing contact with a top face 616 of the lower plate 608 when the upper plate 606 and lower plate 608 are assembled during an injection molding process. The upper portion 610 of the cavity 604 is positioned in the bottom face 614 of the upper plate 606 and the lower portion 612 of the cavity 604 is positioned in the top face 616 of the lower plate 608 so that when the upper plate 606 and the lower plate 608 are in face-sharing contact, the upper portion 610 of the cavity 604 is aligned with and directly above the lower portion 612 of the cavity 604.

The upper and lower portions 610, 612 of the cavity 604 may include geometric patterns forming either protrusions or indentations along surfaces of the cavity 604 that are transferred to surfaces of the set of soles 600. For example, a top surface 618 of the set of soles 600 are depicted in FIG. 6 with a pattern imprinted from the upper portion 610 of the cavity 604. Side surfaces 620 of the cavity 604 may be textured to impart a desired texturing or patterning to side surfaces 622 of the set of soles 600. Furthermore, the lower portion 612 of the cavity 604 may be adapted with channels 624 branching from an inlet port 626, the inlet port 626 and channels 624 fluidly coupling air surrounding the mold 602 to air inside the cavity 604.

The inlet port 626 may provide an opening to the cavity 604 of the mold 602 into which the molten SPS is injected to fill at least a portion of an inner volume of the cavity 604 when the mold 602 is assembled (e.g., the upper plate 614 and lower plate 608 are in face-sharing contact). The inlet port 626 may be configured to couple directly to a nozzle of an injecting device, such as the nozzle 306 of the injecting device 300 of FIG. 3. The nozzle may be inserted into the inlet port 626 to flow the SPS into the cavity 604 through the inlet port 626 and channels 624 with a minimal loss of material from leakage or spillage.

Upon releasing the cured, hardened polymeric material from the confines of the cavity 604 after the baking period, the set of soles 600 may increase in size relative to a size of the cavity 604. For example, the set of soles 600 may expand to 110%, 145%, or 160% of the size of the cavity 604, depending on conditions imposed on the molten polymeric material during the injection molding process. As an example, differences in a final pressure between one cavity of one mold and another cavity of another mold at completion of curing may result in different expansion ratios. Properties of the set of soles 600, such as durability and flexibility, may show differences according to how much the SPS expands. Thus reducing and controlling variation in cavity pressure during the injection molding process may allow for increased control over the expansion ratio of the set of soles 600. The final cavity pressure may be made uniform between molds by repeatably maintaining a pressure profile at the injecting device nozzle during injection.

For example, a preferred expansion ratio may be 145%. A pressure profile for the nozzle of the injecting device for a set composition of the polymeric material may be estimated. The pressure of the nozzle during injection may be measured and used to adjust a flow rate of SPS into the cavity 604 to adhere to the predetermined pressure profile. A cavity pressure may be estimated based on the nozzle pressure, the nozzle pressure measured by configuring the nozzle of the injecting device with a pressure sensor, such as the pressure sensor 330 shown in FIG. 3. Adapting the injecting device with the pressure sensor at the nozzle may provide instantaneous pressure feedback in a closed loop system that allows a controller, such as the computing device 222 of FIG. 2, to immediately adjust an injection rate of the injecting device in response to backpressure due to a rise in pressure in the mold cavity.

For example, rapid injection (e.g., rapid rotation of an electronically controlled screw of an injecting device) of the SPS in the mold cavity may generate backpressure due to a decreasing volume of the cavity. Detection of backpressure in the cavity may allow an immediate decrease in injection rate, dissipating excess pressure and returning the cavity pressure to a desired pressure. Conversely, if pressure in the cavity is detected to decrease, due to a slow injection rate for example, the injection rate may be increased until a target pressure is obtained. The positioning of the pressure sensor at the nozzle enables accurate measurement of the cavity pressure when the nozzle is inserted into the inlet port.

By maintaining a cavity pressure according to a pressure profile, repeatability of the cavity pressure during an injection molding process may be achieved, resulting in a consistent expansion ratio of a polymer product. A graph 700 of a pressure of a nozzle of a first injecting device, such as the injecting device 300 of FIG. 3, is shown in FIG. 7 to illustrate an example of a first plot 702 of a pressure of the injecting device nozzle (solid thick line) when the nozzle is adapted with a pressure sensor that provides pressure feedback to a controller, such as the computing device 222 of FIG. 2. The controller may regulate an injection rate of a molten polymeric material (SPS) into a cavity of a first mold by actuating a drive motor rotating a screw of the injecting device nozzle and/or adjusting a position of a valve in the nozzle based on the pressure detected in the nozzle. The pressure may be compared to a preset pressure profile, specific to a temperature or temperature range of the molten polymeric material or mold cavity, and the injection rate may be adjusted according to a deviation of the measured pressure from the pressure profile.

An x-axis of the graph 700 displays time and a y-axis of the graph 700 displays pressure. The first plot 702 shows the pressure in the nozzle of the first injecting device during formation of a polymer product, such as a sole structure of a shoe. The nozzle is inserted into an inlet port in the first mold to flow the molten SPS, configured to foam and expand, into the cavity of the first mold. The plot 702 of the pressure-feedback system is hereafter referred to as the pressure-feedback plot 702.

The pressure-feedback plot 702 is overlaid with a second plot 704 of a measured pressure of a nozzle of a second injecting device during a formation of a polymer product. The molten SPS that is injected into the first mold is similarly injected into the cavity of a second mold by the second injecting device. The second injecting device is not configured to provide real-time pressure measurements to the controller, however, and the nozzle pressure is not used as a sensory feedback to adjust an injection rate of the polymeric material into the second mold. Hereafter, the plot 704 of the pressure in the second injecting device is referred to as the uncontrolled plot 704.

Four intervals are indicated in graph 700: $T_1$, $T_2$, $T_3$, and $T_4$. The first interval, $T_1$ is a period during which the polymeric material is introduced to barrels of the injecting devices, heated to become molten, and injected into the cavities of the molds. The SPS foams and expands in volume driving an increase in pressure in the molds and generating backpressure that is detected by the pressure sensors in the nozzles of the injecting devices. During $T_1$, the pressure in the nozzle of the first injecting device, shown by the pressure-controlled plot 702, increases rapidly due to the addition of SPS to a barrel of the first injecting device. The pressure plateaus quickly and remains relatively stable due to adjustment of the injection rate based on the pressure feedback information. For example as backpressure increases, a rate of flow of SPS through the injecting device may be decreased to compensate for the higher pressure in the nozzle, thus maintaining an overall uniform pressure at the nozzle.

The uncontrolled plot 704 also increases quickly as the barrel of the second injecting device is filled with the polymeric material. The injection rate is not adjusted and the pressure detected in the nozzle of the second injecting device spikes to a higher pressure than the pressure-controlled plot 702 due to backpressure as the cavity of the second mold is filled with SPS. The measured pressure gradually decreases to a similar pressure as the pressure of plot 702 before the end of $T_1$.

At a start of $T_2$, a hold phase, both plot 702 and 704 decreases abruptly as the flow of SPS in the molds ceases and the polymeric material is no longer added to the barrels of the injecting devices. An estimated cavity pressure of the first mold is represented by a dashed line of plot 708, indicating that the cavity pressure begins to rise in the first mold at the start of $T_2$. The rise in cavity pressure is caused by initiation of curing and expansion of the SPS. Curing is initiated by activation of a cross-linking agent, spurring cell nucleation. A low-pressure set-point is maintained in the first mold, resulting in a uniform pressure in the first mold, as shown in plot 702 between $T_2$ and $T_3$. In contrast, pressure detected in the nozzle of the second injecting device drops to ambient levels, as shown by the uncontrolled plot 704.

A first estimated cavity pressure of the second mold is represented by a dashed line in plot 710 and curing and expansion, indicated by a rise in cavity pressure, does not begin until $T_2$ ends and $T_3$ begins. Curing of the SPS is faster in the first mold, as indicated by plot 708, than in the second mold, as indicated by plot 710, due to the low-pressure set point imposed in the first mold once the mold is filled. The pressure forces the polymeric material to press against a wall of the first mold. The contact between the material and the wall of the first mold allows more rapid and even heat conduction through the polymeric material than in the uncontrolled system depicted by plot 710.

At the end of $T_2$ the injecting devices are moved from the first and second molds to adjacent, empty molds. The removal of the first injecting device from the first mold results in a drop in the nozzle pressure of the first injecting device to ambient levels.

Curing of the SPS in the first mold, shown by plot 708, is complete when $T_3$ ends (and $T_4$ begins). Expansion of the material terminates and the cavity pressure reaches a preset terminal pressure level. The pressure in the second mold, indicated by plot 710 as one example, continues increasing during $T_4$, reaching the terminal pressure level when $T_4$ ends. Significant variation in the curing period may occur arising from variations in pressure at the nozzle of the second injecting device. For example, a second estimated cavity pressure of the second mold is shown by a dashed line in plot 712. A rise in cavity pressure is delayed relative to plot 710 and the pressure does not reach the terminal pressure level by the end of $T_4$. Instead, an extended period of time may elapse before the cavity pressure represented by plot 712 achieves complete curing.

The plots depicted in graph 700 show that the pressure-feedback system allows curing of the SPS to be initiated earlier when a uniform nozzle pressure is maintained. In addition, the consistent nozzle pressure during filling of the mold cavity may result in reduced variation in physical attributes of the polymer product, such as skin thickness and cell size, between products formed in replicate molds. Uniformity between iterations of the polymer product may be further increased by controlling a temperature of the SPS.

Consistency in the properties of the injection molded polymer product may be enhanced by maintaining a temperature of the molten polymeric material within a barrel of the injecting device at a melt temperature of the material. The melt temperature may depend on a composition of the polymeric material. For example, the melt temperature may vary according to a ratio of large and small pellets, such as the large pellets 400 and small pellets 500 shown in FIGS. 4 and 5, and may also be affected by relative amounts of blowing and crosslinking agents.

When the temperature of the barrel of the injecting device falls below the melt temperature, a viscosity of the SPS may increase, decreasing a flow rate of the SPS into the mold cavity and decreasing cavity pressure. When the temperature of the barrel rises above the melt temperature, overcooking of the SPS may occur, altering a cellular structure of the SPS and degrading physical properties of the polymer product. For example, a viscosity of the SPS may be become greatly reduced, affecting an ability of the material to foam and expand. Furthermore, fluctuations in barrel temperature above the melt temperature may lead to increased material waste due to purging of the barrel in between injections to expel overcooked polymeric material from the injecting device.

A likelihood of temperature variability in the barrel of the injecting device may be reduced by adapting the injecting device with a temperature sensor in the barrel, such as the temperature sensor 328 shown in FIG. 3. The temperature sensor detects the temperature of the molten SPS in the barrel and sends the information to the controller. The controller may send a command to heating devices of the injecting device, such as the heating devices 307 of FIG. 3, to adjust a power delivered to the heating device to produce a desired temperature of the barrel. In this way, the temperature sensor, communicatively coupled to the heating devices through the controller, provides a closed feedback system to regulate the temperature of the barrel. If the barrel temperature decreases below the melt temperature, injection of the SPS may be delayed until the temperature is increased to the target temperature. A likelihood of exposure of the polymeric material to temperatures above the melt temperature is reduced. The temperature feedback allows the temperature of the barrel to be maintained at the melt temperature, thereby reducing an amount of wasted material due to overheating of the polymeric material.

The feedback pressure system and the feedback temperature system may be used in combination in some examples, or used independently in other examples. Configurations of the injection molding system including both pressure detection at the nozzle of the injecting device and temperature measurement in the barrel may enable a high degree of conformity to a set of desired material properties of the polymer product. One such property is cell size. As the SPS foams and expands, pockets of gas may form within the material. The pockets of gas, or cells, are enclosed within layers of the polymeric material. Uniformity in flexibility, abrasion resistance, and tensile strength and other mechanical properties across an entirety of the polymer product may be attained by generation of similarly sized cells.

An example of a first cellular structure 800 of a polymeric material produced by an injection molding process is shown in a scanning electron microscope (SEM) image in FIG. 8. The polymeric material with the first cellular structure 800 may be formed without use of a pressure feedback system or temperature feedback system as described above. The first cellular structure 800 includes a plurality of cells 802 that exhibit a range of cell diameters. As shown in an exploded view 804 of the first cellular structure 800, cell sizes vary between 174 microns in diameter to 235 microns.

A SEM image of an example of a second cellular structure 900 of a polymeric material is shown in FIG. 9, depicting cells with a more uniform a cell diameter and distribution. The second cellular structure 900 is formed through an injection molding process where at least the pressure feedback system is applied and, in some examples, the additional temperature feedback system is also employed. While some variation in cell size is observed, an overall range in cell size is narrower in the second cellular structure 900 than the first cellular structure 800. Furthermore, a plurality of cells 902 of the second cellular structure 900 has an overall smaller size, averaging 82 microns in diameter, than the plurality of cells 802 of the first cellular structure 800. The smaller size of the plurality of cells 902 of the second cellular structure 900 allows each cell to be surrounded by a thicker layer, or skin, of polymeric material, thereby increasing a structural integrity of the plurality of cells 902 and of a polymer product formed from the polymeric material.

An example of a routine 1000 for an injection molding process to form a polymer product, such as a sole structure of a shoe, is shown in FIG. 10. A molding system of the injection molding process may include a plurality of molds with inner cavities arranged in a row of chambers, each chamber enclosing a mold of the plurality of molds. An automated injecting device, such as the injecting device 300 of FIG. 3, may be configured with a barrel to receive and store a polymeric material (e.g., to form a SPS) mixed with a chemical blowing agent. In one example, the injecting device may include an additional crosslinking agent, a screw to push the SPS through the injecting device that is electronically controlled, and a nozzle adapted to couple to inlet ports in the mold. The nozzle of the injecting device may include a pressure sensor, such as the pressure sensor 330 of FIG. 3 to detect a pressure of the nozzle as the injecting device injects the SPS into the mold. The pressure sensor and motor driving rotation of the screw may be adapted to communicate electronically with a controller, such as the computing device 222 of FIG. 2, configured to receive sensory information and send commands to actuators of the molding system.

At 1002, the routine includes filling the barrel of the injecting device with a polymeric material with a pre-set blend of small and large pellets, including the polymeric material mixed with the chemical blowing agent and the crosslinking agent, and providing a fixed composition of the material. The barrel is heated to melt the material to form the molten SPS. The routine includes injecting the molten SPS into the cavity of the mold at 1004. The pressure of the nozzle is monitored by the pressure sensor at 1006 while the SPS is injected. The nozzle pressure is relayed to the controller and compared to a preset pressure profile stored in a memory of the controller.

At 1008, the fill rate, or injection rate, is adjusted based on the detected cavity pressure. For example, if the pressure is detected to rise above a pressure setting of the pressure profile, the fill rate may be decreased until the pressure returns to a target pressure. As another example, if the cavity pressure decreases below the pressure setting of the pressure profile, the fill rate may be increased until the pressure reaches the target pressure.

At 1010, the routine includes curing the molten SPS. Curing the material incudes either injecting a crosslinking agent, such as a peroxide, if not already added, or activating a crosslinking agent already mixed with the polymeric material, to induce polymer crosslinking. Concurrent with 1010, the controller commands a purging of remaining SPS stored in the injecting device barrel at 1012. The injecting device is shifted to an adjacent mold at 1014, with the barrel of the injecting device filled with fresh SPS, and returns to the start of the routine at 1002.

An example of a routine 1100 for an injection molding process to form a polymer product, such as a sole structure of a shoe, is shown in FIG. 11. A molding system of the injection molding process may include a plurality of molds with inner cavities arranged in a row of chambers, each chamber enclosing a mold of the plurality of molds. An automated injecting device, such as the injecting device 300 of FIG. 3, may be configured with a barrel to receive and store a polymeric material mixed with a blowing agent. In some examples, the injecting device may include an additional crosslinking agent (e.g., to form a SPS), a screw to push the SPS through the injecting device that is electronically controlled, and a nozzle adapted to couple to inlet ports in the mold. The barrel of the injecting device may include a temperature sensor, such as the temperature sensor 328 of FIG. 3 to detect a temperature of the polymeric material within the barrel of the injecting device. The temperature sensor and motor driving rotation of the screw may be adapted to communicate electronically with a controller, such as the computing device 222 of FIG. 2, configured to receive sensory information and send commands to actuators of the molding system.

At 1102, the routine includes filling the barrel of the injecting device with a polymeric material with a pre-set blend of small and large pellets as well as the blowing agent and crosslinking agent, providing a fixed composition of the polymeric material. A barrel temperature of the injecting device is adjusted at 1104. Adjusting the barrel temperature may include receiving a signal at the controller from the temperature sensor in the barrel, the signal relaying the temperature detected in the barrel which is also the temperature of the SPS in the barrel. The controller compares the barrel temperature to a preset melt temperature of the SPS at 1106, where the melt temperature is dependent on the composition of the polymeric material. For example, a look-up table may be stored in the controller's memory with a ratio of chemical components of the polymeric material as an input and a corresponding melt temperature as an output that is adapted as a temperature setpoint for the barrel temperature. A difference between the detected barrel temperature and the melt temperature may be used to correct the barrel temperature by adjusting a power output to heating devices of the injecting device.

For example, if the temperature of the barrel is lower than the melt temperature, the power to the heating devices may be increased until the temperature reaches the melt temperature and remains at the melt temperature for a duration of time, such as 5 seconds. As another example, if the temperature in the barrel is determined to be higher than the melt temperature, the power to the heating devices may be decreased to allow the SPS to cool until the temperature is reduced to the melt temperature. Adjustment of the barrel temperature to the melt temperature may include continuous intervals of increasing and decreasing the power to the heating devices, in successively smaller increments until the temperature of the barrel stabilizes at the melt temperature. Furthermore, exposure of the SPS in the barrel to temperatures above the melt temperature for a threshold period of time, such as 10 seconds, may result in a purging of injecting device to decrease a likelihood that overcooked material is injected into the mold.

Returning to 1106, if the temperature of barrel and SPS is not at the melt temperature, the routine returns to 1104 to continue adjusting power to the heating devices to modify the temperature of the SPS. If the temperature of the barrel is detected to be at the melt temperature, the routine continues to 1108 to inject the molten SPS into the cavity of the mold while the barrel temperature is maintained at the melt temperature. At 1110, the routine includes moving the injecting device to another, adjacent mold. Unless the temperature of the barrel is detected to rise above the melt temperature for more than the threshold period of time, as described above, the injecting device is not purged between injections to the plurality of molds, thereby reducing a period of time for transitioning between each mold and also decreasing an amount of wasted SPS. The routine returns to 1102 to repeat routine 1100.

It will be appreciated that although the pressure feedback system and the temperature feedback system are shown as independent systems in routines 1000 and 1100 of FIGS. 10 and 11, respectively, other examples may incorporate both systems operating cooperatively. In such systems injection of the SPS into the molds may be delayed until both the cavity pressure is determined to match the pressure setting of the pressure profile and the barrel temperature is at the melt temperature. Application of both pressure feedback and temperature feedback into a single injection molding system may enhance a consistency of a polymer product, thereby increasing efficiency and reducing costs incurred by wasted materials.

In this way, a sole structure for an article of footwear may be manufactured by an injection molding process. The injection molding process may be automated and include an injecting device, upstream of a plurality of molds, adapted to couple to the plurality of molds to inject a molten polymeric material into a cavity of each of the plurality of molds. A nozzle of the injecting device may be adapted with a pressure sensor, where the pressure sensor may be included in a pressure feedback loop that relays a pressure of the nozzle to a controller. In response, the controller may instruct an electronically actuated screw of the injecting device to rotate and push the polymeric material into the cavity at a rate that maintains the cavity pressure at a pressure according to a preset pressure profile. Additionally, a barrel of the injecting device, configured to store the polymeric material and including heating devices to heat the barrel, may be adapted with a temperature sensor to detect a temperature of the polymeric material within the barrel. The temperature sensor may be a component in a temperature feedback loop that includes relaying the temperature of the barrel to the controller. The controller may command adjustment of the heating of the barrel to maintain the temperature of polymeric material at a melt temperature of the material. The pressure feedback loop may increase a uniformity of physical properties of the sole structure, including an expansion ratio and a consistency of cell diameter, and also increase a repeatability of the pressure-based conditions during the injection molding process. The temperature feedback loop may reduce an amount of material waste arising from temperature fluctuations during the injection molding process that may degrade the polymeric material. Overall, an efficiency and production output of the injection molding process is improved.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of molding a sole structure, the method comprising:
   injecting a molten polymeric material through a nozzle of an injection device and into a mold, wherein the injection device comprises a pressure sensor coupled to the nozzle, the pressure sensor adapted to detect a pressure in the nozzle;
   receiving the molten polymeric material in a cavity of the mold;
   adjusting a flow rate of the molten polymeric material through the nozzle based on a pressure in the nozzle detected by the pressure sensor; and
   releasing the molten polymeric material from the mold to allow for expansion of the molten polymeric material to form the sole structure.

2. The method of claim 1, further comprising maintaining positive pressure on the molten polymeric material in the mold after completing injection of the molten polymeric material into the mold.

3. The method of claim 1, wherein adjusting the flow rate comprises electronically adjusting a screw attached to the injection device in response to a signal from the pressure sensor.

4. The method of claim 1, further comprising curing the molten polymeric material.

5. The method of claim 1, further comprising forming, prior to the injecting, a molten single phase solution (SPS) comprising a blowing agent and the molten polymeric material, wherein the blowing agent is dissolved in the molten polymeric material.

6. The method of claim 1, wherein the molten polymeric material comprises a combination of pellets of different compositions and/or sizes that are melted together to form the molten polymeric material.

7. The method of claim 1, further comprising detecting a temperature of the molten polymeric material during the injecting using a temperature sensor, and adjusting the flow rate of the molten polymeric material based on the temperature detected by the temperature sensor.

8. The method of claim 7, wherein the temperature sensor is located in a barrel of the injection device, and wherein the barrel is located upstream of the nozzle.

9. The method of claim 1, wherein the adjusting of the flow rate is further based on a deviation of measured pressure from a pressure profile.

* * * * *